United States Patent [19]

Gatto

[11] 4,230,777
[45] Oct. 28, 1980

[54] BATTERY HOLDER WITH INTEGRAL ACCESS DOOR AND POWER SWITCH

[75] Inventor: Donald F. Gatto, Sunrise, Fla.

[73] Assignee: Motorola, Inc., Schaumburg, Ill.

[21] Appl. No.: 26,623

[22] Filed: Apr. 2, 1979

[51] Int. Cl.³ .............................................. H01M 2/10
[52] U.S. Cl. ........................................ 429/97; 429/98
[58] Field of Search ...................... 429/97, 98, 100, 1

[56] References Cited

U.S. PATENT DOCUMENTS

| | | | |
|---|---|---|---|
| 2,916,538 | 12/1959 | Rose | 429/98 |
| 3,138,491 | 6/1964 | Rubio | 429/97 |
| 3,701,862 | 10/1972 | Vignini | 429/97 |
| 3,745,049 | 7/1973 | Kaye | 429/87 |

FOREIGN PATENT DOCUMENTS 93522  3/1959  Denmark ................................. 429/98

*Primary Examiner*—Donald L. Walton
*Attorney, Agent, or Firm*—Margaret Marsh Parker; James W. Gillman

[57] ABSTRACT

A battery as for a miniature communication device is retained within a hollow knurled knob captivated within the device housing. The side of the knob projects from the housing to provide thumb control of the switch, and has an open side portion to provide battery access. Spring contacts access the battery terminals through apertures in the knob. Function indicia are provided on the knob and are visible on the projecting portion as appropriate.

3 Claims, 5 Drawing Figures

BATTERY HOLDER WITH INTEGRAL ACCESS DOOR AND POWER SWITCH

BACKGROUND OF THE INVENTION

This invention relates to the field of miniature battery-powered devices and, more particularly, to the provision of an inexpensive battery housing and power switch arrangement.

In very small electronic devices such as personal pagers, such components as batteries, battery housings and power switches tend to limit the miniaturization of the device. Complex switching arrangements tend to increase costs of both parts and labor. Many types of power switches are available for use in miniature devices, but all have one or both of the above disadvantages. Most known battery housings require some degree of disassembly in order to replace a battery, with attendant possibility of loss of parts. An ideal solution would combine easy battery access and switching function integral with the battery housing and would include appropriate indicia for the user.

SUMMARY OF THE INVENTION

It is therefore an object of the present invention to provide a battery housing with integral switching elements and battery access.

It is a particular object to provide the above, along with appropriate indicia, by means of inexpensive nondetachable components.

These objects and others are provided in a battery housing arrangement as for a small battery-powered device including circuitry. The housing arrangement includes an insulating housing and an insulating rotatable knob which is retained and rotated within the housing with only a side portion projecting. The knob is hollow and retains the battery on the interior and the exterior curved wall is knurled so that, as the knob is rotated by the thumb of the user, conductors mounted on the housing make contact with the battery cell terminals. The center, or positive terminal, of the battery cell is in constant contact with the circuitry, and the case or negative terminal is contacted as desired through an aperture in the upper surface of the knob. With more than one contact and one or more apertures on top, more than one power circuit could be opened and closed as the knob is rotated. The knob also has an aperture in the side through which the battery can be removed and replaced by rotation of the knob to the appropriate position. Indicia on the top surface of the knob are designated appropriately as the knob is turned.

DETAILED DESCRIPTION OF A PREFERRED EMBODIMENT

Figure 1:
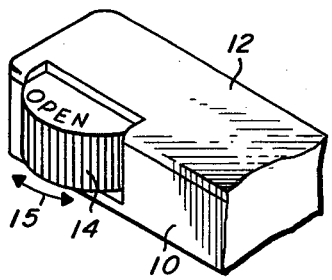
FIG. 1 is a perspective view of a portion of a battery-powered device showing the battery compartment closed.

FIG. 1 shows a small, battery-powered electronic device; e.g., a personal pager, utilizing the present invention. A two-part housing 10, 12 is shown retaining a hollow knob/battery compartment 14. The knob 14 is shown as cylindrical, but other rotatable shapes could be used. As will be noted hereinafter, the housing could, in other applications, be a one-piece housing. The knob/compartment 14 is rotatable as indicated by an arrow 15. A portion of the knob/compartment 14 would, in any case, be positioned to protrude from an aperture 16 (see FIG. 2) in the housing wall. The curved wall of the knob could be knurled, as shown, or textured in some other manner to allow easy rotation of the knob by the user's finger. The remainder of the housing 10, 12 would contain circuitry appropriate to the function of the device, but not forming a part of the present invention beyond the requirement for certain battery connections. Indicia 17 on the knob/compartment 14 will be discussed with respect to FIGS. 3 and 5.

Figure 2:
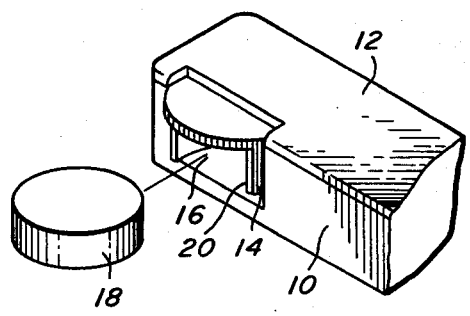
FIG. 2 is a perspective view as in FIG. 1, but with a battery being inserted.

FIG. 2 shows the device of FIG. 1 with a battery 18 about to be inserted through an aperture 20 in the knob/compartment 14. The knob has been rotated from the position of FIG. 1.

Figure 3:
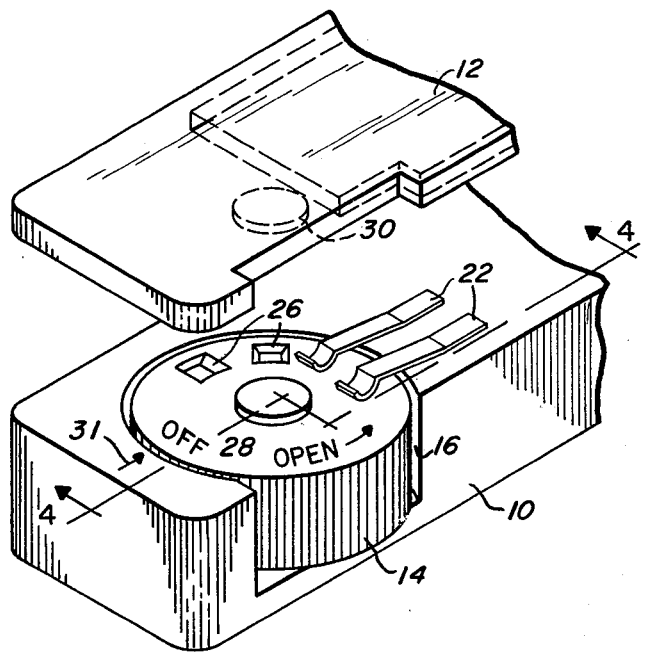
FIG. 3 is a perspective view as in FIG. 1, with the housing cover removed.

FIG. 3 shows the housing of FIGS. 1 and 2 with the top portion 12 removed. The knob/compartment 14 is inserted into the aperture 16 and one or more resilient contactors 22 are positioned to forcefully contact the upper surface 24 of the knob/compartment. In the surface 24 are one or more apertures 26, through which the contactors 22 make electrical contact to the negative terminal of the battery 18 when the knob/compartment 14 is appropriately rotated. The apertures 26 will preferably have sloping or rounded walls along the radial direction for reduced contact abrasion. The upper surface 24 of the knob/compartment 14 also includes a pivot element 28 which could mesh with a recess 30 in the underside of the housing half 12. If no cover portion 12 is utilized and the knob/compartment 14 is retained within the housing by the contacts 22 or by other means, no pivot member 28 will be required. In this case, the indicia 17 could be designated in a different fashion; e.g., a mark 31. No specific means is shown for retaining the contacts 22 on the housing 10, as the retaining means is not relevant to the present invention. However, it will be appreciated that some means of both affixing the contacts 22 to the housing and to the circuitry contained therein would be required.

Figure 4:
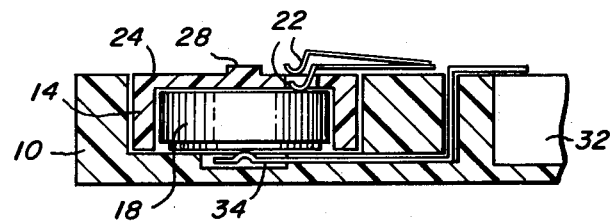
FIG. 4 is a cut-away view of FIG. 3 along the line 4—4.

FIG. 4 is a cut-away view of FIG. 3 along the line 4—4. In the area designated by the numeral 32 would be the circuitry of the particular device. The center or positive terminal of the battery 18 is contacted by a contact 34 which may be a resilient spring contact as shown. One of the contactors 22 is shown in the lowered or contacting position, that is, having dropped through one of the apertures 26 and onto the case or negative terminal of the battery 18. Another contactor 22 is shown in the raised position resting on the surface 24 of the knob/compartment 14.

Figure 5:
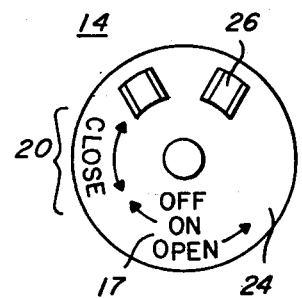
FIG. 5 is a top view of the battery compartment, showing a possible arrangement of indicia and contact apertures.

FIG. 5 shows a top view of the knob/compartment 14 with two apertures 26 visible on the surface 24 and the aperture 20 indicated for a position reference. Indicia 17 are given as exemplary only and serve merely to indicate possible combinations of indicia which might apply. For example, if "OFF" is visible through the aperture 16, the apertures 26 would not be in alignment with the contactors 22 and the knob would preferably be rotated in a clockwise position as indicated to turn the device ON. If "OPEN" is visible, and it is desired to remove or replace the battery, the knob/compartment 14 would preferably be rotated in a counter-clockwise direction. It is obvious that either direction of rotation will cause the knob to arrive at any given position but those designated are preferable.

Thus there has been shown and described a battery housing arrangement for battery-powered apparatus which combines a battery compartment, battery access and battery circuit switching plus appropriate indicia in a simple arrangement of a hollow "knob" having an aperture for battery removal and apertures for battery contact. The knob projects for easy rotation by a finger of the user and no parts are required to be removed from the assembly for battery replacement, thus no parts can be lost in the process. Other variations and modifications of the invention are possible and it is intended to cover all such as fall within the spirit and scope of the appended claims.

What is claimed is:

1. A battery cell housing arrangement for an electronic device having circuitry therein and comprising in combination:
   a rotatable insulating element having a first recess therein, the first recess being dimensioned to receive a battery cell and having a first aperture in a side wall, the first aperture being dimensioned to admit the battery cell to the first recess, and having at least one second aperture in the upper surface thereof, positioned intermediate the center and the perimeter of the surface for exposing a portion of the battery cell case;
   an insulating housing having a second recess with a third aperture therein, the second recess being dimensioned to fixedly retain the rotatable element for 360° rotation, with substantially less than one-half of the rotatable element projecting from the third aperture of housing element;
   a first conductive member supported by the housing and coupled to circuitry therein and positioned to make continuous electrical contact with a first terminal of the battery cell; and
   at least one second conductive member formed of a resilient material, supported by the housing and coupled to circuitry therein, positioned to contact and ride upon the upper surface of the rotatable element and, as the rotatable element is rotated to at least one first predetermined position, contacting a second cell terminal through one of the second apertures in the rotatable element, and, in a predetermined position, being insulated from the second cell terminal by the upper surface of the rotatable element;
   and where no portion of the first aperture is aligned with the third aperture when the rotatable element is in one of the first and second positions.

2. A battery housing arrangement in accordance with claim 1, wherein the housing includes a third recess in an inner surface thereof and the rotatable element includes a pivot member projecting from the upper surface thereof and centrally located thereon for being received by the third recess.

3. A battery housing arrangement in accordance with claim 1 and wherein the rotatable element has indicia on the upper surface thereof, said indicia being related to the position of the rotatable element, and the housing exposes predetermined ones or groups of indicia as determined by the portion of the rotatable element projecting from the housing elements.

* * * * *